(12) United States Patent
Kominami et al.

(10) Patent No.: US 6,785,595 B2
(45) Date of Patent: Aug. 31, 2004

(54) ELECTRONIC CONTROL SYSTEM FOR VEHICLE ACCESSORY DEVICES

(75) Inventors: Yukio Kominami, Novi, MI (US); Jungwon Lee, Plymouth, MI (US); Jason D. Stafne, Novi, MI (US); Hirohide Suda, Dublin, OH (US); Matthew J. Lehmer, Columbus, OH (US)

(73) Assignees: Honda Giken Kogyo Kabushiki Kaisha (JP); Sumitomo Wiring Systems, Ltd. (JP)

( * ) Notice: Subject to any disclaimer, the term of this patent is extended or adjusted under 35 U.S.C. 154(b) by 96 days.

(21) Appl. No.: 10/075,515

(22) Filed: Feb. 13, 2002

(65) Prior Publication Data

US 2003/0152088 A1 Aug. 14, 2003

(51) Int. Cl.[7] .................................................. G06F 7/00
(52) U.S. Cl. ............... 701/36; 340/426.25; 340/426.34; 340/438
(58) Field of Search ............................... 701/36, 1, 24, 701/33, 35; 340/426.25, 426.34, 438

(56) References Cited

U.S. PATENT DOCUMENTS

| | | | | |
|---|---|---|---|---|
| 5,559,707 A | * | 9/1996 | DeLorme et al. | ............ 701/200 |
| 5,848,373 A | * | 12/1998 | DeLorme et al. | ............ 701/200 |
| 5,922,037 A | | 7/1999 | Potts | |
| 6,321,158 B1 | * | 11/2001 | DeLorme et al. | ............ 701/201 |
| 6,349,257 B1 | * | 2/2002 | Liu et al. | ..................... 701/200 |
| 6,445,287 B1 | * | 9/2002 | Schofield et al. | ........... 340/442 |
| 6,553,308 B1 | * | 4/2003 | Uhlmann et al. | ........... 701/208 |
| 6,559,773 B1 | * | 5/2003 | Berry | ...................... 340/815.4 |

FOREIGN PATENT DOCUMENTS

| | | |
|---|---|---|
| JP | 09-159581 | 6/1997 |
| JP | 10-329628 | 12/1998 |

* cited by examiner

Primary Examiner—William A. Cuchlinski, Jr.
Assistant Examiner—Olga Hernandez
(74) Attorney, Agent, or Firm—Harness, Dickey & Pierce, P.L.C,

(57) ABSTRACT

A system and method for managing user preference settings in a vehicle includes an electronic control unit having a microcontroller and memory. The electronic control unit controls vehicle accessory devices. A data controller is in communication with the microcontroller of the electronic control unit for receiving the user preference data to control the accessory devices. The keyless receiver is in communication with the microcontroller of the electronic control unit for receiving a control signal from a key fob. A PDA including a processor, memory, and transceiver in electrical communication can be used to transmit the user preference data to the data controller. The preference data is transmitted to the memory of the electronic control unit, which executes an algorithm to control the accessory devices according to the user preference data.

19 Claims, 13 Drawing Sheets

| DATA ||
|---|---|
| HI-Byte | LO-Byte |
| Driver 1 | Auto light |
| Auto door lock | Panic |
| Auto light off 1 | Auto light off 2 |
| Dome light | Buzzer |
| Driver 2 | Auto light |
| Auto door lock | Panic |
| Auto light off 1 | Auto light off 2 |
| Dome light | Buzzer |
| Keyless Fob | Keyless Fob |

Interior Lighting - Driver 1

Time to OFF after closing
all doors: 0 ⇕ seconds 0                    seconds                    30

[Done]

*Figure - 8F*

Instrument Panel - Driver 1

Illumination Brightness:
5 ⇕ brightness level

Dark                              Light

[Done]

*Figure - 8G*

Auto Lights - Driver 1

Auto Light ON Options:
▽ ON in Medium outdoor light
Auto Light OFF Options:
▽ Ignition OFF, driver's door CLOSED
Time to Auto OFF:    5 ⇕ seconds 0           seconds           60

[Done]

*Figure - 8H*

Buzzer - Driver 1

Emergency brake/door ajar buzzer

Activate the buzzer when vehicle is
shifted out of "Park" position if:
☑ Emergency Brake is set
☑ Any door is ajar

[Done]

*Figure - 8I*

| DATA ||
| --- | --- |
| HI-Byte | LO-Byte |
| Driver 1 | Auto light |
| Auto door lock | Panic |
| Auto light off 1 | Auto light off 2 |
| Dome light | Buzzer |
| Driver 2 | Auto light |
| Auto door lock | Panic |
| Auto light off 1 | Auto light off 2 |
| Dome light | Buzzer |
| Keyless Fob | Keyless Fob |

*Figure - 11*

ELECTRONIC CONTROL SYSTEM FOR VEHICLE ACCESSORY DEVICES

FIELD OF THE INVENTION

The present invention generally relates to electronic control systems and, more particularly, an electronic control system for controlling vehicle accessory devices as well as a wireless communication system for programming the electronic control system.

BACKGROUND OF THE INVENTION

Modern automotive vehicles typically include an electronic control system having an electronic control unit coupled to various electrical accessory devices. The electronic control unit may include a microprocessor and non-volatile memory. The microprocessor controls multiple electrical accessory devices in the vehicle by executing the operating instructions of the control program. Such control programs in vehicles govern the operation of electrical accessory devices and features such as automatic door locks, interior lights, instrument panel illumination, exterior lights, keyless door locks, audible notification signals, windshield and lamp wiper systems, security system, etc.

In view of the recent advances in modern automotive vehicles, however, user capability for programming preference settings for electrical accessory devices have been deficient. In existing electrical control units, users are not able to choose the preference settings for most electrical accessory devices. Further, the programming of these functions is physically defined in the manufacturing process and is not provided to the end user. For example, vehicles equipped with headlamp control functions that automatically turn the headlights on and off at a predetermined threshold of ambient brightness and turn off the headlights when the driver exits the vehicle do not allow a user to program the predetermined threshold of ambient brightness or the length of time before the headlights are turned off after the user exits the vehicle. Also, existing entry light control devices use an internal timer to turn off the light after a predetermined period of time, typically including a dimming operation, but do not allow the user to choose the time period before the entry lights turn off. Moreover, existing door lock controls include factory-programmed lock and unlock conditions. These lock and unlock conditions can be vehicle speed sensitive or depend on key and door operations, but do not provide the capability for the end user to program the particular speed or particular key and door operations that trigger the lock and unlock conditions.

Further, in user programmable functions provided in contemporary automotive vehicles, such as memory seat position and audio system preferences, the user must select every preference setting from inside the vehicle. This input process is often time consuming, inconvenient, awkward, and limited. Further, each function must be defined by an input device in the vehicle.

SUMMARY OF THE INVENTION

The system and method according to the invention provides user programmable control functions for vehicle accessory devices that are input using a user interface. Control information is communicated from the user interface to an electronic control unit via a data controller. Further, the user interface preferably includes a transceiver circuit for producing and transmitting wireless control signals and vehicle-specific software for setting and programming user specified functions. Vehicle-specific software can be installed on the user interface, such as a personal digital assistant (PDA), vehicle information system, or navigation system.

The data controller receives and transmits user-selected function data from the user interface and includes a transceiver and encoder/decoder. This data controller may be a component independent from the vehicle, or may be included in other vehicle components such as the center cluster, audio/video system, or climate control system. The control unit includes a microprocessor and non-volatile memory. The non-volatile memory is electrically reloadable with data for controlling an object of control by executing a control program made up of data stored in the non-volatile memory. This control unit includes the vehicle electronic control unit for controlling automatic lights, door locks, interior lights, memory seats, instrument panel illumination, automatic headlamps, keyless door locks, and notification tones, as well as audio system and climate control system preferences. Further, the data controller and the control unit can be coupled together.

Generally, the user interface includes a graphical user interface (GUI) for inputting user-selectable options and a data processor for encoding the input data to a specified infrared data transmission format or radio data format (such as Bluetooth, available from the Bluetooth Special Interest Group at www.bluetooth.com).

Wireless communication with the data controller can be achieved with any type of PDA, or hand-held computer, preferably running PALM OS (available from Palm, Inc. of Santa Clara, Calif.) or a compatible operating system such as Windows CE (available from Microsoft Corp. of Redmond, Wash.). Generally, the accessory devices of the automotive vehicle can be simply programmed to user preferences using a PDA and the vehicle electronic control unit. For example, the automatic headlamp control function can be programmed with multiple threshold conditions and multiple automatic off conditions. In this function, a threshold value of ambient brightness decides light on and off points. A user can select one of these thresholds and an automatic-off condition, or can completely disable these functions. For the automatic-off option, the user can select various signal conditions including driver-door open, driver-door closed, or keyless lock set. As another example, the user can select entry-light off time with a selectable delay time. Also, the door-lock control gives the user selectable options with multiple lock and unlock conditions. A combination of these lock and unlock conditions, which depend on vehicle speed, key position, transmission position and door operations, provides a user with various preference settings. A user can also select an audible notification signal, or buzzer, for warning of certain vehicle conditions such as door open or parking brake engagement.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 8F is the interior lighting screen shot of the vehicle preferences manager of FIG. 8;

FIG. 8G is the instrument panel screen shot of the vehicle preferences manager of FIG. 8;

FIG. 8H is the auto light screen shot of the vehicle preferences manager of FIG. 8;

FIG. 8I is the buzzer screen shot of the vehicle preferences manager of FIG. 8;

FIG. 11 is a table illustrating the data structure of the memory of a system for managing vehicle preference data according to the invention.

DETAILED DESCRIPTION OF THE PREFERRED EMBODIMENTS

The following description of the preferred embodiment(s) is merely exemplary in nature and is in no way intended to limit the invention, its application, or uses.

Figure 1:
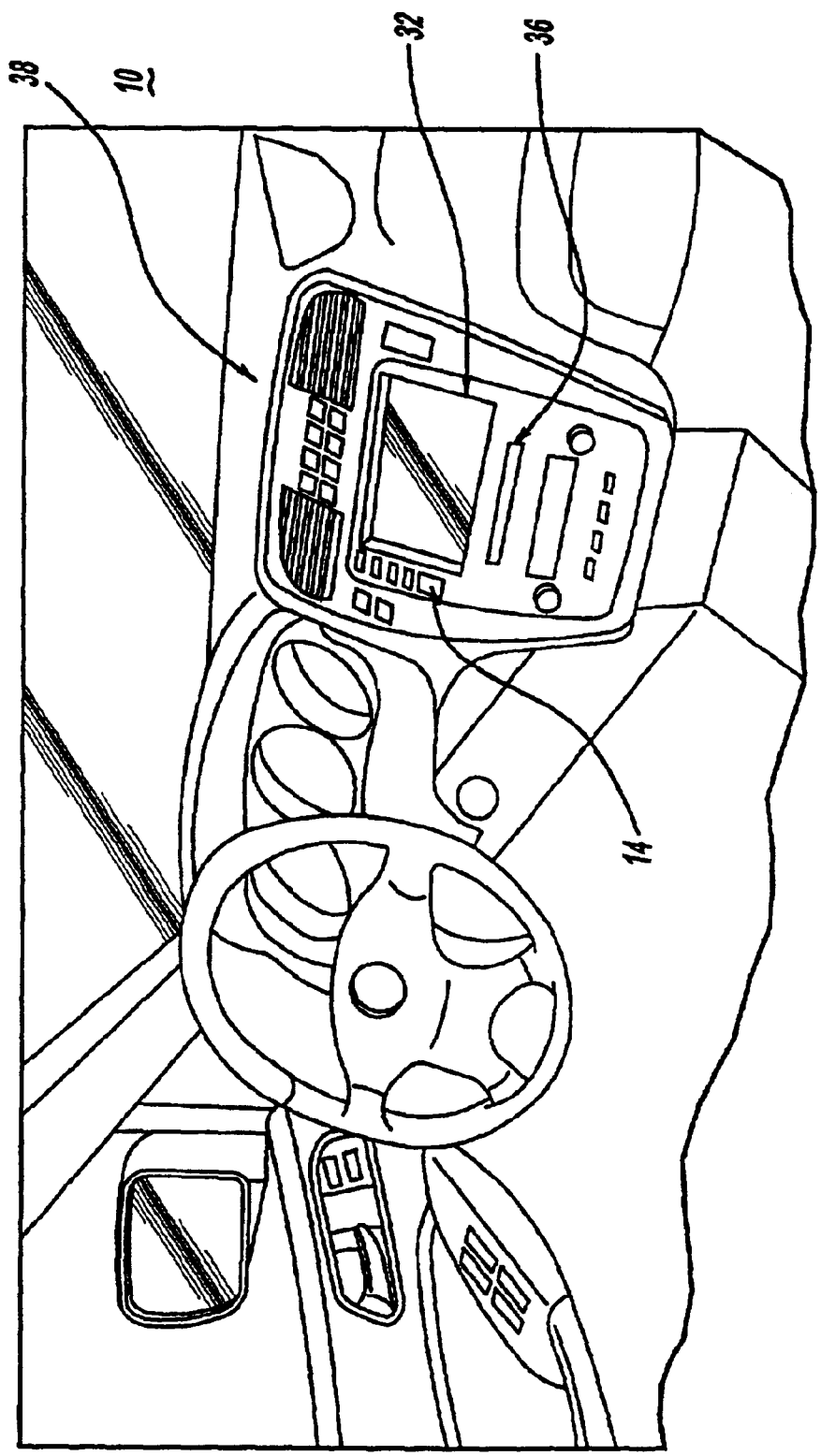
FIG. 1 is a partial perspective view of a vehicle including a system for managing user preference settings according to the invention.
Figure 2:
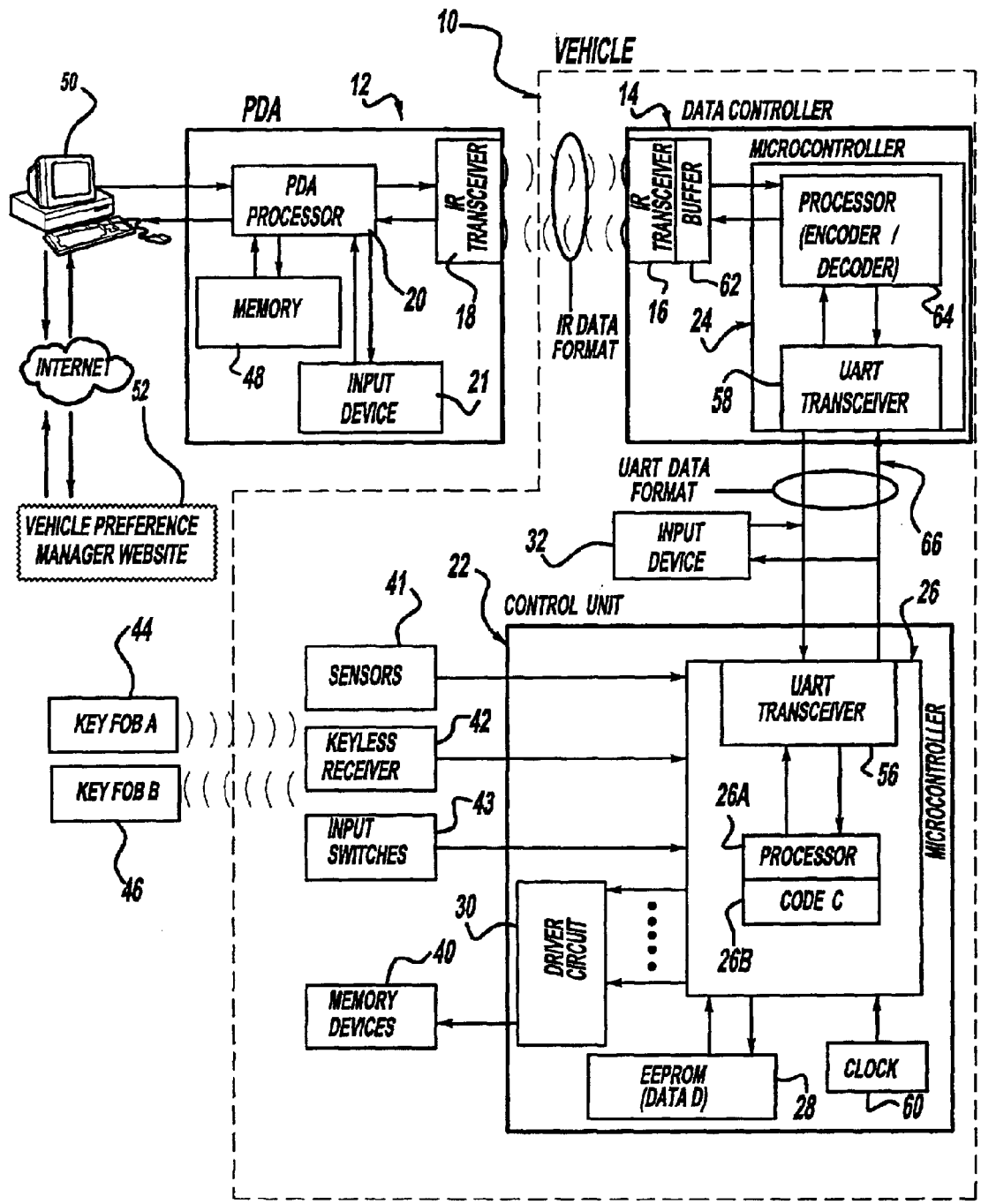
FIG. 2 is a schematic view of the system for managing user preference settings according to the invention.

With reference to FIGS. 1 and 2, a vehicle 10 according to the invention is shown. The vehicle 10 includes a data controller 14 for two-way communication with a transceiver 18 of a computer such as PDA 12, or which can be hardwired to a vehicle information system or navigation system, which can be used as an input device 32. FIG. 2 illustrates both arrangements, which may be used cooperatively or alternatively. The data controller 14 and user interface 32, as shown, are housed in a vehicle console 38. The PDA 12 will be used as an exemplary hand-held computer, but other computer devices, including other hand-held devices, can be used.

As shown, the data controller 14 of the vehicle 10 includes a transceiver 16 and a microcontroller 24. The microcontroller 24 includes a buffer 62, processor 64, and a UART transceiver 58. The processor 64 includes an encoder/decoder. As shown in FIG. 2, the microcontroller 24 of the data controller 14 encodes and decodes data transmitted therethrough. As shown, vehicle preference data is received via infrared transmission from the PDA 12, and specifically via the transceiver 18 of the PDA 12. The transceiver 16 of the data controller 14 receives the data, which is then formatted as UART data by the processor 64 and transmitted from the UART transceiver 58 of the microcontroller 24 to the UART transceiver 56 of a vehicle electronic control unit 22. The vehicle preference data received by the electronic control unit 22 is stored in EEPROM 28.

Figure 10:
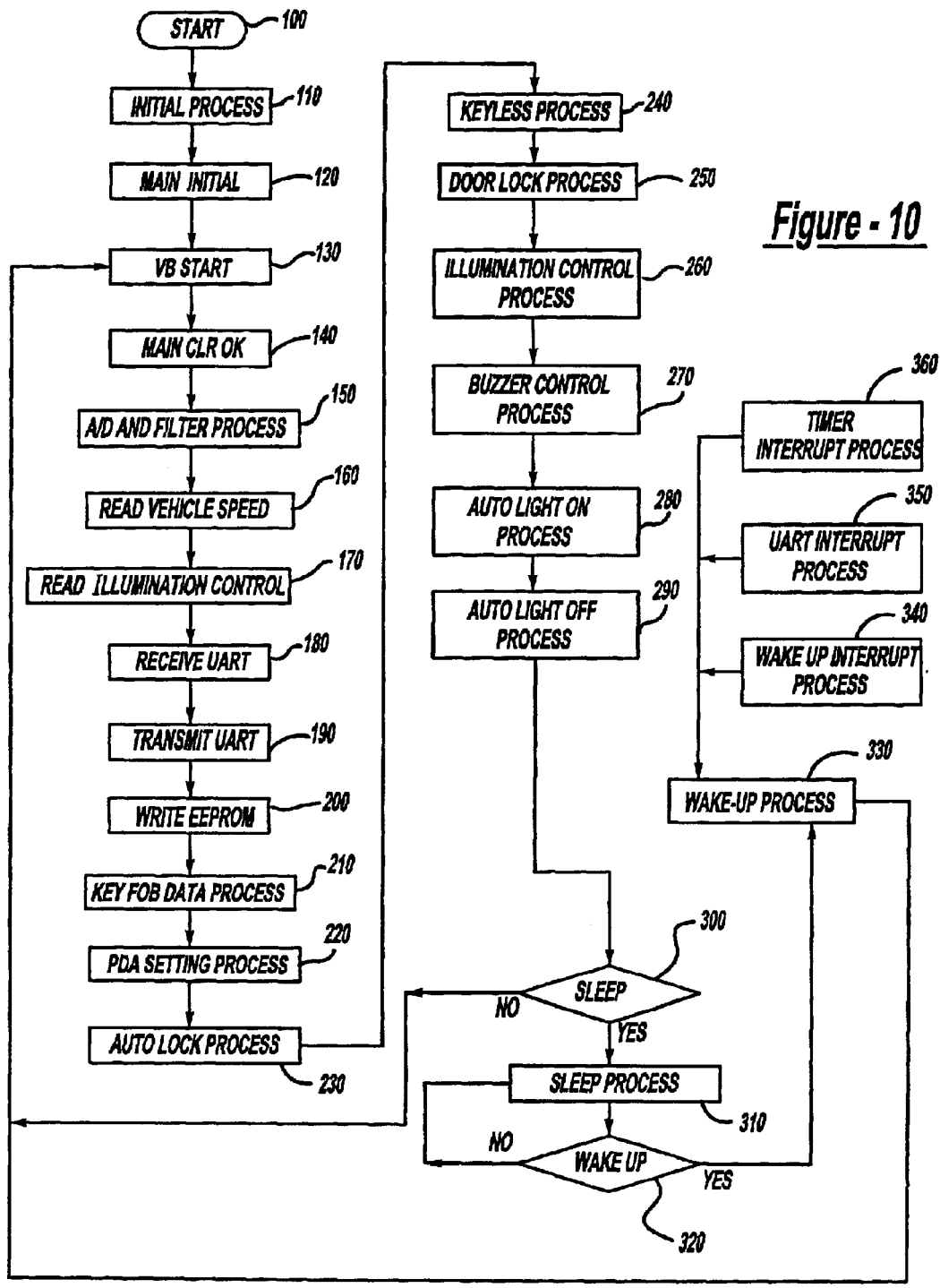
FIG. 10 is a flowchart illustrating the transmission and execution of user preference data according to the invention.

The PDA 12 includes a processor 20 in communication with the transceiver 18 and for executing control instructions, as well as an input device 21 for inputting user settings. Similarly, the vehicle 10 includes the electronic control unit 22 in communication with the transceiver 16 of the vehicle 10 through the microcontroller 24 of the data controller 14. The electronic control unit 22 of the vehicle 10 is responsible for electronic control of accessory devices 40, sensors 41, keyless receiver 42, and switches 43 of the vehicle 10 and includes a microcontroller 26, EEPROM 28, and driver circuit 30. A resonator or clock 60 is in communication with the microcontroller 26. The microcontroller 26 includes a processor 26A and a memory 26B. The EEPROM 28 includes data structure D (as shown in FIG. 11) while the microcontroller 26 includes code C (as shown in FIG. 10) in its memory 26B. The vehicle 10 may alternatively or additionally include a user input device 32, such as a vehicle information or navigation system 32, which is in two-way communication with the microcontroller 26 of the electronic control unit 22.

The PDA 12 and vehicle 10 are in two-way communication via a hard-wired or wireless signal. Specifically, the transceiver 18 of the PDA 12 is in two-way communication with the transceiver 16 of the vehicle 10. In one variation, transceivers 16, 18 are wireless transceivers and the wireless signal is an infrared or radio frequency signal. In another variation, the PDA 12 is in two-way communication with the vehicle 10 through a hard-wired connection. In such a variation, the PDA 12 can be docked in a port 36 to facilitate hard-wired communication between the transceiver 18 of the PDA 12 and the transceiver 16 of the vehicle 10. In FIG. 1, the port 36 is shown housed in the vehicle console 38. In another variation, data transmission can be both wireless and hard-wired, adding additional communication flexibility.

Figure 3:
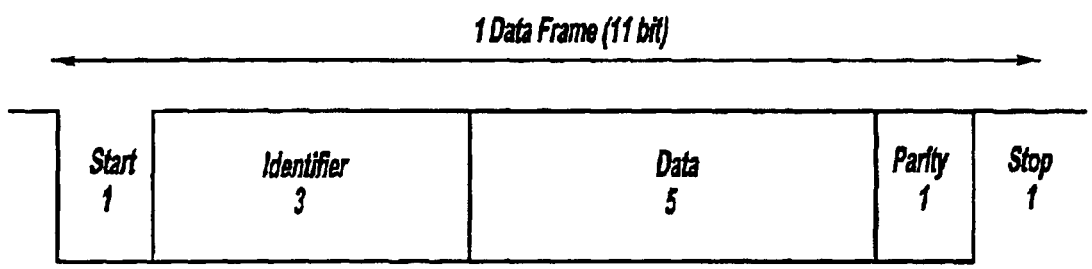
FIG. 3 illustrates a data frame for transmitting user preference data according to the invention.

The data is transmitted between the PDA 12 and data controller 14 in a ten-bit segment: one start bit, three ID bits, five data bits, and one stop bit; and the data is further transmitted from the data controller 14 to the microcontroller 26 in an eleven-bit segment adding an odd parity bit. The start bit will be low (zero), and the stop bit will be high (one). In one example, the baud rate is 9600 bps. An exemplary eleven-bit segment, or data frame, is shown in FIG. 3. As shown in FIG. 2, data transmission between the PDA 12 and data controller 14 is wireless, and particularly infrared wireless transmission. That is, a ten-bit segment, or IR data format, is transmitted between the transceiver 18 of the PDA 12 and the transceiver 16 of the data controller 14. The transceiver 16 transmits a ten-bit segment electrical signal, which is converted from the received infrared signal, to the processor 64. The UART transceiver 58 transmits an eleven-bit segment, or UART data format, to a UART transceiver 56 of the vehicle electronic control unit 22 via UART bus 66.

Figure 4:
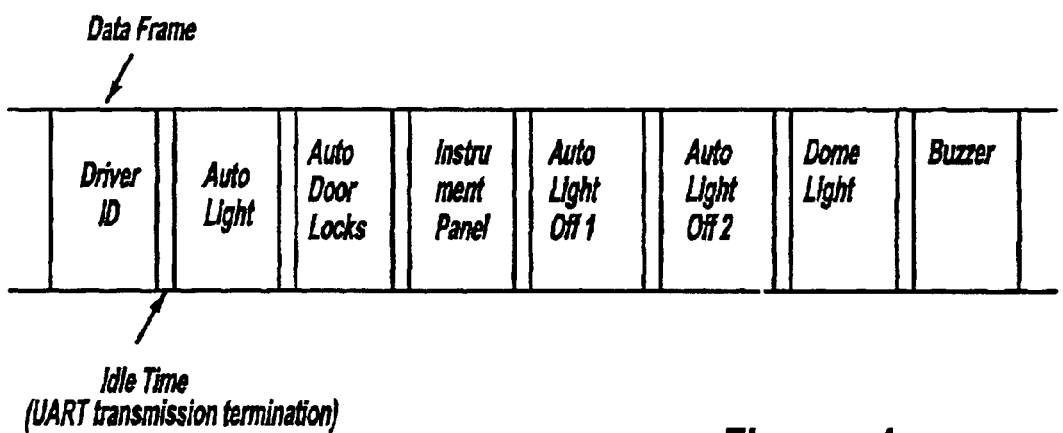
FIG. 4 illustrates a series of data frames relating to various user preference settings according to the invention.

When transmitting new setting data to the vehicle 10, the PDA 12 sends a three-bit driver identifier data segment followed by seven data frames respectively corresponding to automatic lighting, automatic door locks, instrument panel, automatic light off 1, automatic light off 2, dome light, and buzzer. The eight data frames are sent in succession with an idle time of less than one millisecond between successive data frames, as best illustrated in FIG. 4.

After transceiver 16 of vehicle 10 receives data from the PDA 12, the microcontroller 24 decodes the data and then sends the data to the electronic control unit 22. The EEPROM 28 of the electronic control unit is rewritten with this updated data. Specifically, the EEPROM 28 is updated with the data in the same frame format shown in FIG. 4. More specifically, Appendix A lists the five data bits for each of the eight data frame types.

Figure 5:
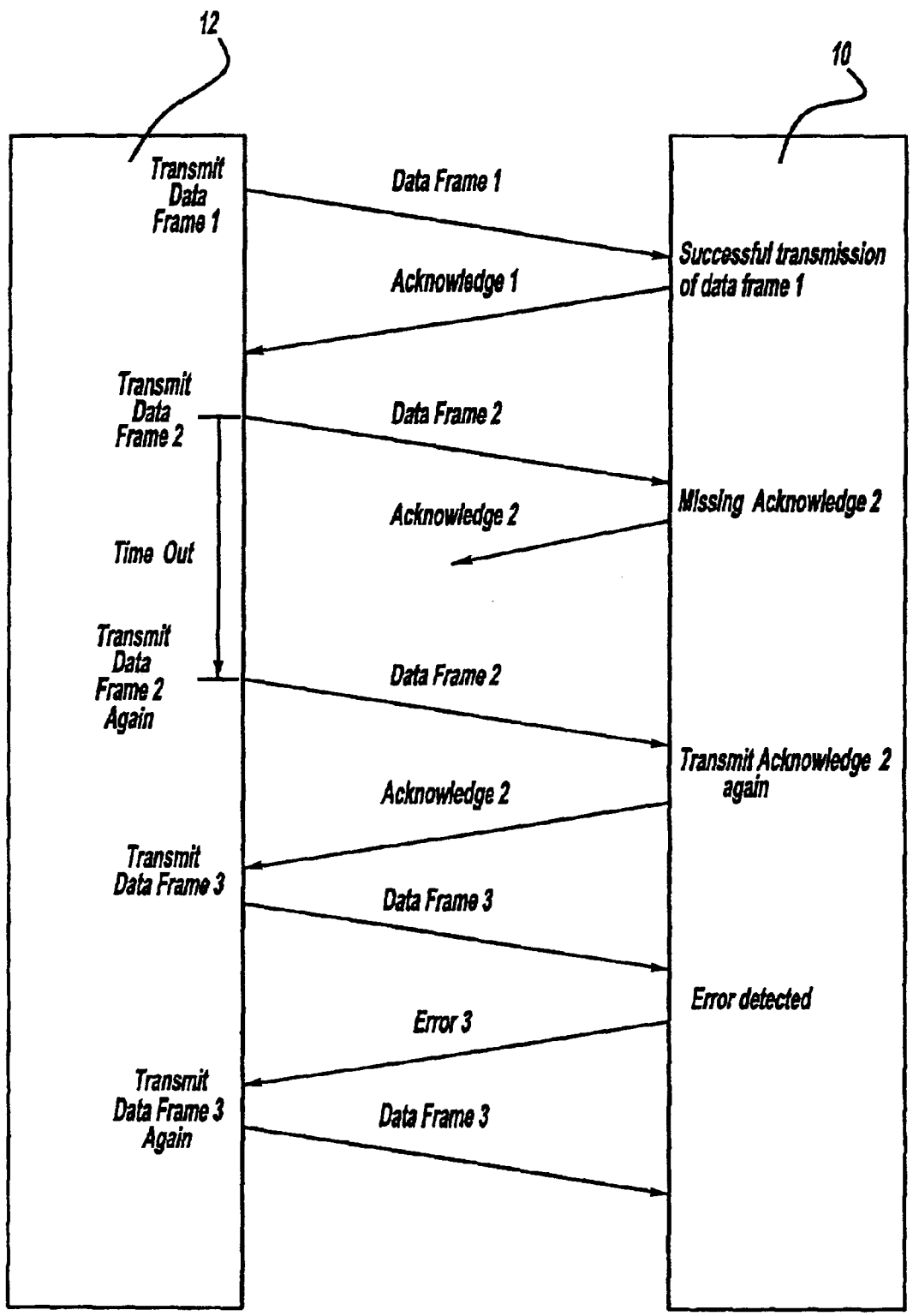
FIG. 5 is a schematic view of the transmission of data from a PDA to a vehicle according to the invention.
Figure 6:
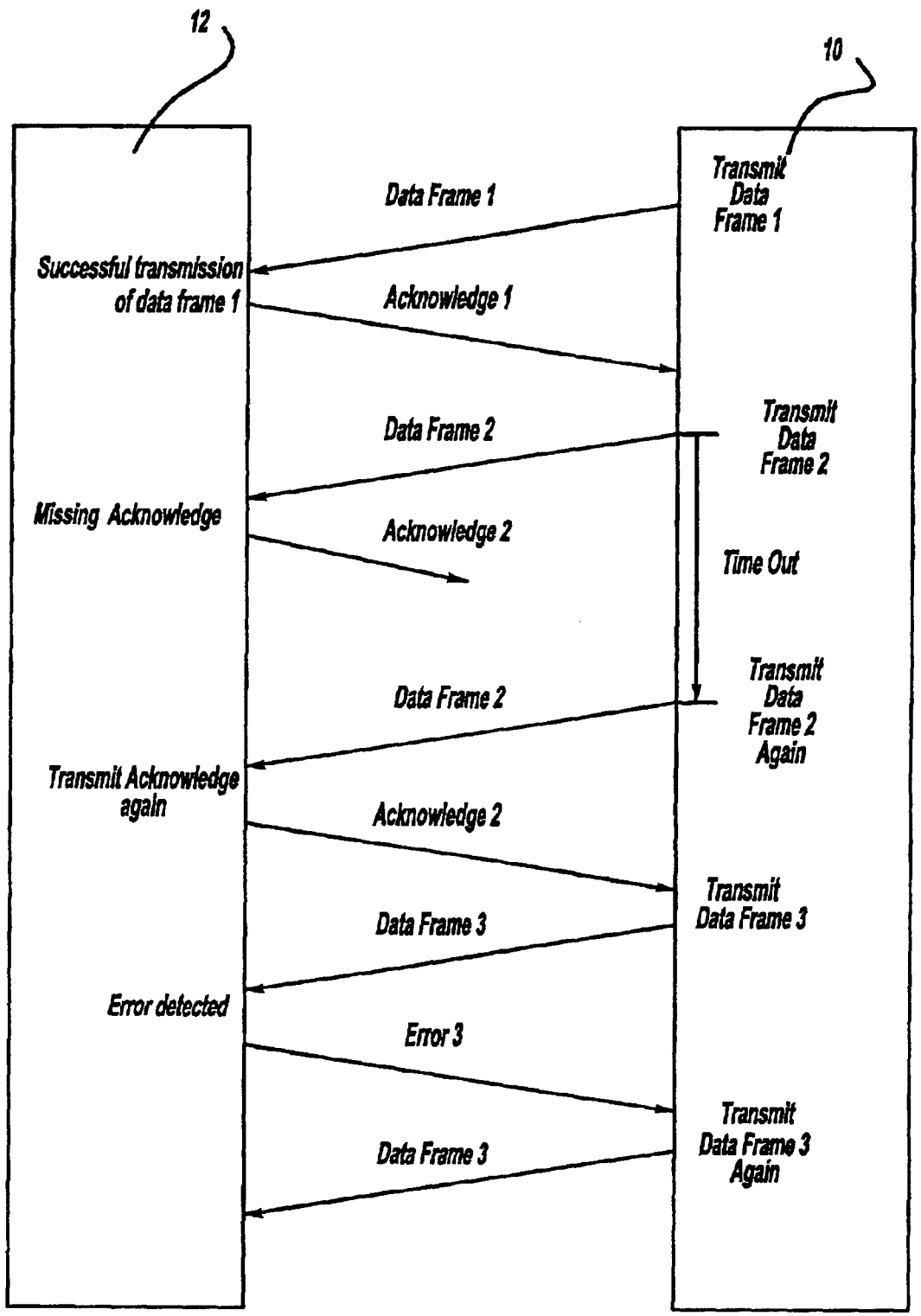
FIG. 6 is a schematic view of the transmission of data from a vehicle to a PDA according to the invention.

Two-way communication with automatic repeat request (ARQ) between the transceiver 18 of the PDA 12 and the transceiver 16 of the vehicle 10 allows the vehicle 10 to acknowledge the successful transmission of data from the PDA 12. Alternatively, high-level data link control communication can be used. With reference to FIG. 5, a schematic illustrates that upon sending Data Frame 1 to the vehicle 10, the PDA 12 awaits an acknowledgment message of the successful transmission of Data Frame 1 based on a stop-and-wait flow-control technique. Upon receipt, transmission of Data Frame 1 is complete. Note with the transmission of Data Frame 2 to the vehicle 10, the PDA 12 does not receive an acknowledgment message before the time period for receiving a response from the vehicle 10 times out. At such point, the PDA 12 sends Data Frame 2 again an acknowledgment request message to the vehicle 10, which then transmits an acknowledgment message. Upon receipt of the acknowledgment message from the vehicle 10, the PDA 12 transmits Data Frame 3. In this case, Data Frame 3 contains an error, which the data controller 14 of the vehicle 10 detects and transmits an error message to the PDA. Upon receipt of the error message, the PDA 12 re-transmits the Data Frame 3 until it is successfully received and acknowledgment of its receipt is provided by the vehicle 10. With reference to FIG. 6, transmission of operation data to the PDA 12 from the vehicle 10 operates in a similar manner.

Referring again to FIG. 2, the data transmission of user preference settings will be explained in further detail. The PDA 12 includes the transceiver 18 for two-way communication with the transceiver 16 of the vehicle 10. While wireless data transmission is shown, such data transmission may be wireless and/or hard-wired. Further, the PDA 12 includes the processor 20 and an input device 21, such as a keyboard, touch screen or stylus. The transceiver 16 is in two-way communication with the microcontroller 24, which is in two-way communication with the microcontroller 26 of the electronic control unit 22. The microcontroller 26 receives input signals from sensors 41, keyless receiver 42, and switches 43 of the vehicle 10. Moreover, the driver circuit 30 of the electronic control unit 22 is controlled by the microcontroller 26 and operates the accessory devices 40. Multiple key fobs 44, 46 are able to send wireless data to the keyless receiver 42 for communication with the microcontroller 26.

The input device 21 of the PDA 12 is used to input user preference settings to the PDA 12, specifically to memory 48 of the PDA 12. The PDA processor 20 transmits encoded user preference settings to the transceiver 18 of the PDA 12, which in turn sends data from the PDA 12 to the vehicle 10, and specifically to the transceiver 16 of the data controller 14. Such data transmission is wireless and/or hard-wired. The transceiver 16 transmits the received data to the microcontroller 24, which decodes the received data. The microcontroller 24 transfers the decoded data to the vehicle electronic control unit 22, specifically to the microcontroller 26, via the UART bus 66. In a variation of the invention, the data is transmitted via serial bus from hardwired input device 32, such as a vehicle information system or navigation system. Such an input device 32 may include a transceiver, microcontroller, and/or encoder/decoder.

The microcontroller 26 of the vehicle electronic control unit 22 also receives keyless control signals from key fobs 44, 46, which are received via radio frequency by the keyless receiver 42 and sent via a control signal to the microcontroller 26. The microcontroller 26 also receives from the EEPROM 28 an output of user information to correspond to the respective key fob for which the control signal was received. The microcontroller 26 also sends user information corresponding to key fob type to the EEPROM 28. Finally, the microcontroller 26 sends control signals to the driver circuit 30, which, in turn, operates the corresponding vehicle accessory devices 40.

Figure 7:
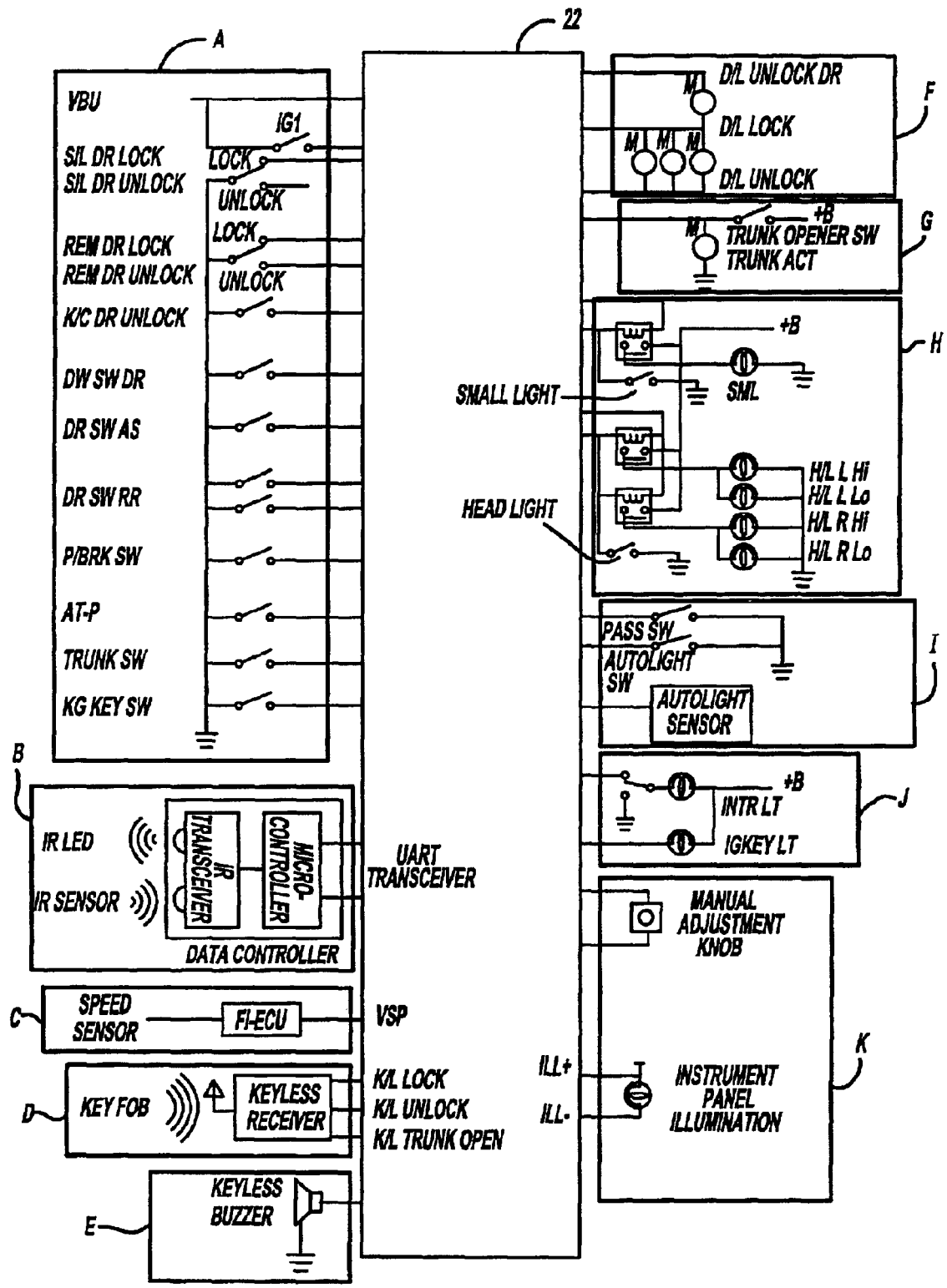
FIG. 7 is a schematic view of a vehicle electronic control unit including various inputs and outputs according to the invention.

The vehicle electronic control unit 22 is shown schematically connected to various sensors, switches, meters and accessory devices in FIG. 7. Specifically, the lock, unlock, door and trunk switches are monitored at group A, as well as parking brake, transmission position, and ignition switch condition. Group B is a data controller, including an infrared wireless transceiver 16 and microcontroller 24. Optionally, a radio-frequency receiver may be used. Group C is a speed sensor for sending vehicle speed data to the vehicle electronic control unit 22. Keyless receiver 42 for receiving radio wave signals from key fobs 44, 46 is shown as group D for sending lock, unlock, and trunk open signals to the vehicle electronic control unit 22. Group E is a keyless buzzer for sending various audible notification signals relating to keyless operation. The door lock and unlock control is provided at group F, while group G provides the same function for the vehicle trunk. Headlight and small light control is provided by group H, while automatic light control and sensing is provided at group I. Group J provides interior lighting control including ignition key lighting control. A dimming circuit for instrument panel illumination, including a manual adjustment knob, is provided by group K. As shown, the vehicle electronic control unit 22 receives input signals from Groups A, B, C, D, and I and operates Groups E, F, G, H, J and K, but more or fewer sensors, switches, meters and accessory devices may be interconnected.

Figure 8:
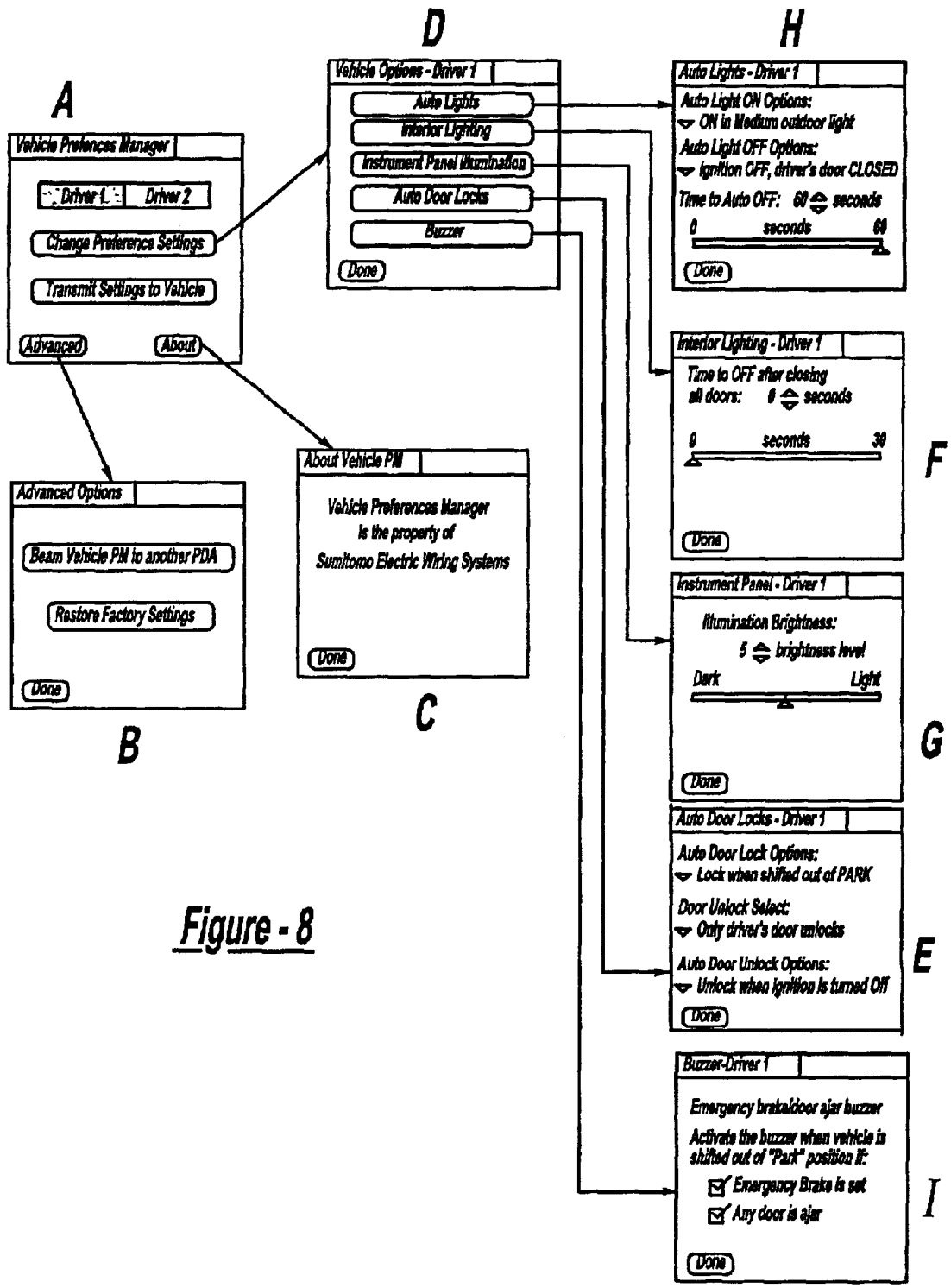
FIG. 8 is an illustration of screen shots for the vehicle preference manager according to the invention.
Figure 8A:
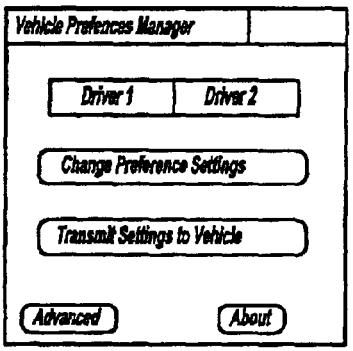
FIG. 8A is a screen shot of the main menu of the vehicle preference manager of FIG. 8.
Figure 8B:
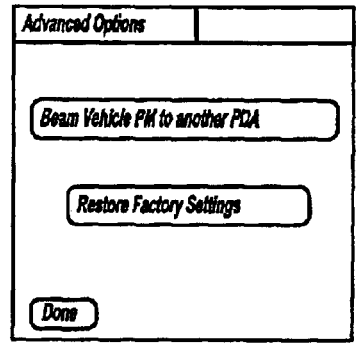
FIG. 8B is the advanced options screen shot of the vehicle preference manager of FIG. 8.
Figure 8C:
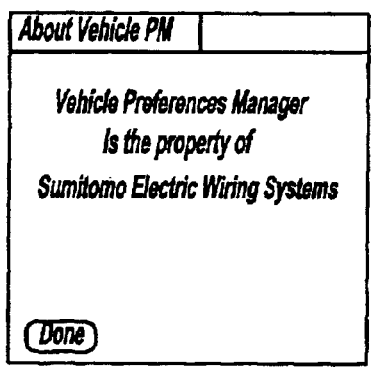
FIG. 8C is the about screen shot of the vehicle preferences manager of FIG. 8.

Next, we will more specifically address the various control functions and the user selectable preferences provided by the present invention. Specifically, the PDA 12 of the present invention provides the user with various preference options in programming the EEPROM 28 of the vehicle ECU 22. FIG. 8 is a collection of screen shots of the graphical user interface for the PDA 12. The screen shot of FIG. 8A illustrates that initially the user selects whether they are changing the preferences for Driver 1 or Driver 2. Further, this screen gives the user the option of changing the preference settings or transmitting the settings to the vehicle for the selected driver. Also, this screen shot illustrates that the user may select advanced options, as shown in the screen shot of FIG. 8B, which allow the user to beam the vehicle preference manager software to another PDA or restore the factory settings. The "About" option provides information about the product, such as that shown in the screen shot of FIG. 8C.

Figure 8D:
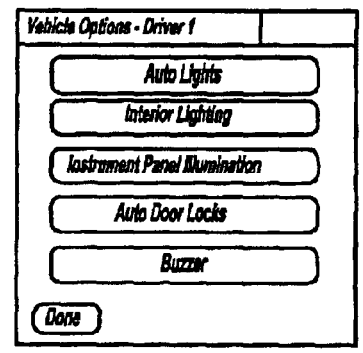
FIG. 8D is the vehicle options screen shot of the vehicle preferences manager of FIG. 8.

By selecting "Driver 1" and "Change Preference Settings" in the screen shot of FIG. 8A, the user is presented with the screen shot of FIG. 8D, which provides vehicle options for automatic lights, interior lighting, instrument panel illumination, automatic door locks, and buzzers.

Figure 8E:
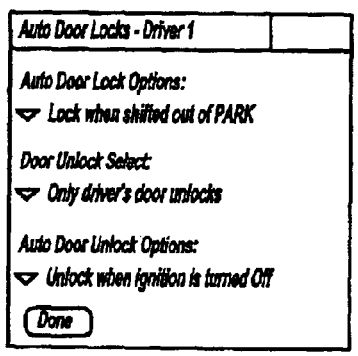
FIG. 8E is the auto door locks screen shot of the vehicle preferences manager of FIG. 8.

First, regarding the automatic door locks, a user is given several unlock options to input from the PDA 12, as illustrated in the screen shot of FIG. 8E. The locking options include disabling automatic locks, locking when ignition is turned on, locking when the vehicle exceeds a predetermined threshold speed, or locking when the vehicle transmission is shifted from park. Further, the user is given several automatic door unlock selections including unlocking all doors or only unlocking the driver's door. Finally, the user is given several unlock options including unlocking when shifted into park and vehicle speed equals zero, unlocking when ignition is turned off, or unlocking when the key is removed from the ignition cylinder.

As shown in the screen shot of FIG. 8F, there are several interior light options provided by the PDA 12. Interior lights are controlled to turn on by a door switch or keyless entry, and controlled off by the door switch. When the door switch is closed, the time to off is dependent on information contained in the EEPROM 28 as input by the driver from the PDA 12. The time to off is user selectable between zero and 30 seconds. A smaller or larger time range may be provided as desired.

Instrument panel illumination is also user selectable, as shown in the screen shot of FIG. 8G. Instrument panel brightness setting can be input via the PDA 12. The instrument panel backlighting is also adjustable manually with a dial in the vehicle if a change is required.

With reference to the screen shot of FIG. 8H, automatic headlamp control, including small lights and rear lights control, automatically turn the lights on at one of four driver-selectable settings provided by the PDA 12. The lights can be set to always on, on in low brightness, on in medium brightness, or on in high brightness. Further, the headlamp, small lights and rear lights will automatically turn off at one of three driver-selectable settings from the PDA 12 including off when ignition is off and the drive's door is opened, timed off from zero to 60 seconds when ignition is off and the driver's door is opened and then closed, and timed off from zero to 60 seconds when ignition is off and keyless lock is initiated.

Keyless and door lock control functions (not shown) may also be selected from the PDA as well. Options include controlling the door lock motor to lock(unlock the door by door lock switch input or controlling the door lock motor and trunk opener by the key fob's wireless transmission. Other control functions available to the user include keyless acknowledgment and door lock motor superlock functions via superlock relay based on key cylinder switch input.

As shown in the screen shot of FIG. 8I, buzzer control functions provided by the PDA include activating the buzzer when (1) the vehicle is shifted out of park and (2) either the emergency brake is on or any door is ajar.

The PDA 12 stores vehicle preference management software in its memory 48. This software allows a user to select preference settings for vehicle accessory devices. Updates to the software, either to provide additional functionality or to accommodate new vehicle models or changes in manufacturer electronic control unit settings, ate accommodated by downloading updated software, or in the case of a new user, the initial downloaded software, via a vehicle preference manager website 52. That is, the website 52 includes software downloads for new users as well as updates for existing users. A user obtains the new or updated software by connecting the PDA 12 to a networked PC 50, which has a connection to the Internet, as shown schematically in FIG. 2. By accessing the vehicle preference manager website 52, the user is able to download the desired software to the networked PC 50, and then install and run the software on the PDA 12 connected to the networked PC 50. Alternatively, the PDA 12 directly connects to the website 52 via the Internet to receive the software.

The vehicle preference management software allows a user to select preference settings for various vehicle accessory devices. With reference to FIGS. 2 and 7, the vehicle preference management software operating on the PDA 12 enables the PDA 12 to interface with the data controller 14 to transmit user preference data to the vehicle electronic control unit 22. Such transmission may be wireless or hard-wired, and occurs between the transceiver 18 of the PDA 12 and the transceiver 16 of the vehicle 10, as best shown in FIG. 2.

Figure 9:
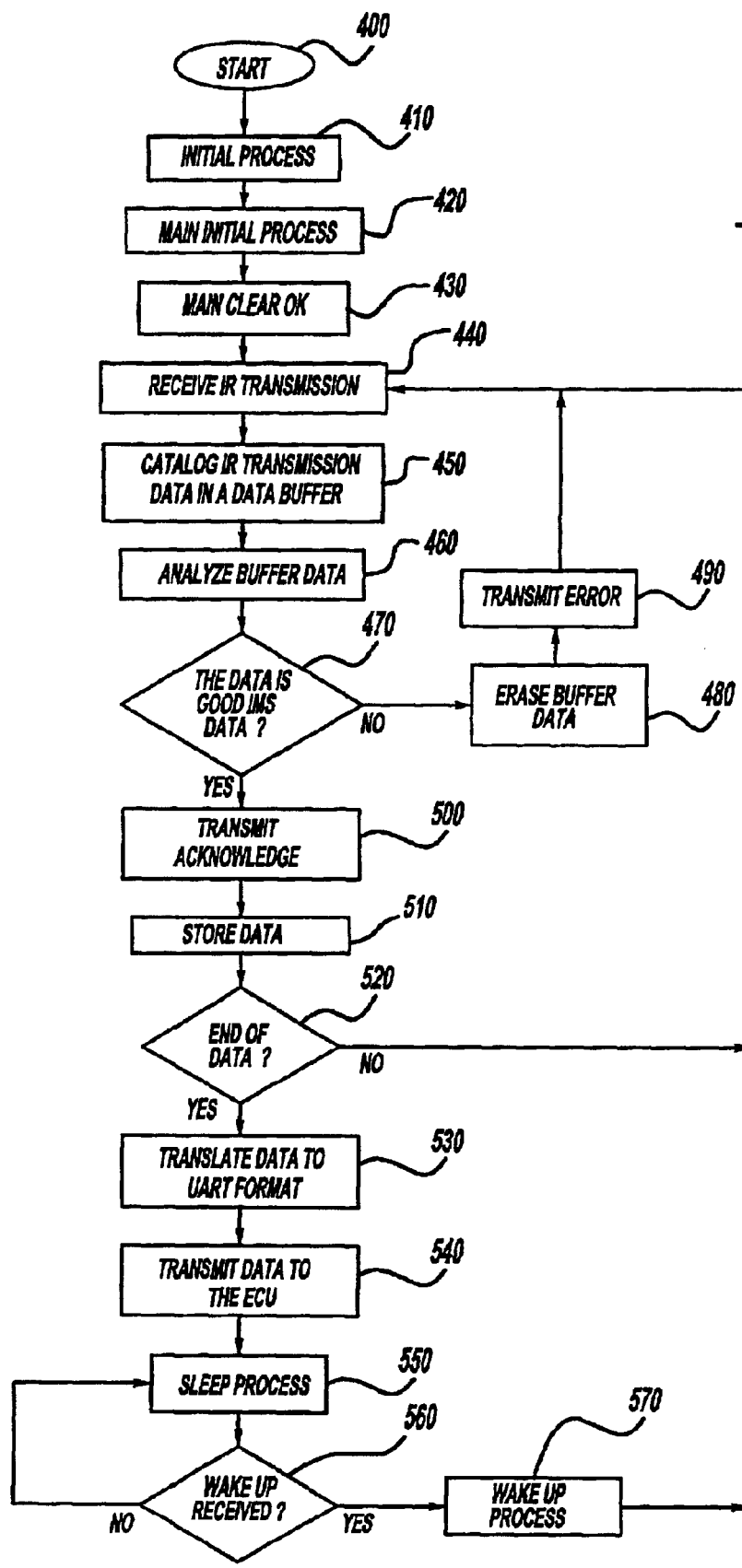
FIG. 9 is a flowchart illustrating transmission of user preference data according to the invention.

More specifically, with reference to FIG. 9, the process for transmitting user preference data from transceiver 18 of the PDA 12 to the transceiver 16 of the vehicle 10 is shown in a flow chart. At step 400, the process starts and then initializes in steps 410 and 420, followed by a clearance step 430. At step 440, the transceiver 16 receives an infrared transmission of a vehicle preference data frame in ten-bit segments, which is then catalogued in a data buffer 62 (FIG. 2) at step 450. The vehicle preference data frame in the data buffer 62 is analyzed by the microcontroller 24 at step 460. At step 470, if the vehicle preference data frame is determined not to be valid, the data buffer 62 is erased at step 480. At step 490, the transceiver 16 transmits an error signal to request retransmission of the vehicle preference data frame at step 440. If the vehicle preference data frame is determined to be valid, the transceiver 16 transmits an acknowledgment message indicating successful transmission of the data frame at step 500. The data is stored in the internal memory of the microcontroller 24 in step 510. At step 520, the process returns to step 440 until reception of the end data frame. At step 530, the data is translated to the UART data frame format, an eleven-bit data segment explained previously and shown in FIG. 3, by the processor 64 of microcontroller 24. Further, Appendix A includes the five-bit vehicle preference data portions of the eleven-bit data segments. In step 540, the UART formatted data is transmitted by the UART transceiver 58 of the data controller 14 to the UART transceiver 56 of the vehicle electronic control unit 22. When all the vehicle preference data has been transmitted, the transceiver 16 enters a sleep process at step 550 until a wake up is received. At step 560, if the wake up is received, the transceiver 16 enters a wake-up process at step 570 and goes back to step 440. If no wake up is received, the process stays in the sleep process at step 550.

With reference to FIG. 10, the electronic control unit 22 includes an algorithm for receiving vehicle preference data, writing it to the EEPROM 28, and controlling vehicle preferences according to the user input. Particularly, the algorithm is stored as Code C in memory 26B of the microcontroller 26. At step 100, the process starts, and then initializes in steps 110 and 120. A VB start commences in step 130 followed by a clearance step 140. The AD and filter process initiates at step 150, followed by reading vehicle speed at step 160 and instrument panel illumination brightness at step 170. At step 180, the vehicle preference manager algorithm receives any UART data, followed by transmitting any UART data at step 190. At step 200, any received data is written to the data structure D of the EEPROM 28, followed by the key fob data process 210 used to determine Driver 1 or Driver 2 data preference. Steps 220–290 are performed by executing code structure C in the microcontroller memory 26B. First, the PDA setting process 220 is performed. Next, the particular vehicle preference data segments are processed, including the automatic-lock process at step 230, the keyless process at step 240, the door-lock process at step 250, the illumination-control process at step 260, the buzzer-control process at step 270, the automatic-light on process at step 280, and the automatic-light off process at step 290. A decision to enter the sleep process 310 or return to the beginning of the algorithm is commenced at step 300. The sleep process 310 checks for inputs/outputs to determine if wake-up process 330 is to be performed or to conserve power when no inputs/outputs are processing. The wake-up process at step 330 can be initialized from the wake-up decision at step 320, a wake-up interrupt process at step 340, a UART interrupt process at step 350, or a timer interrupt process at step 360.

An example data structure is included in FIG. 11, including sample vehicle preference data for Driver 1 and Driver 2. The data structure D of the memory 28 is written with this vehicle preference data after transmission from the PDA 12 to the UART 58 of the vehicle electronic control unit 22. Other vehicle preference data includes automatic door lock and unlock, interior light, interior illumination, automatic head lamp, keyless door lock, climate control, buzzer for locking confirmation, alarm, automatic wiper with moisture sensor, security system (theft deterrent), audio and display control setting, navigation system destination setting by PDA address data, radio and TV station setting, memory seat, exit seat, memory side mirror, memory interior mirror, remote panic, adjustable steering column, adjustable pedals, adjustable suspension, adjustable power steering, automatic headlight leveling, remote entry control, automatic window open by keyless, power moon roof control, power management, voice activation, and diagnosis. Other vehicle preference settings are considered within the scope of the invention.

Figure 12:
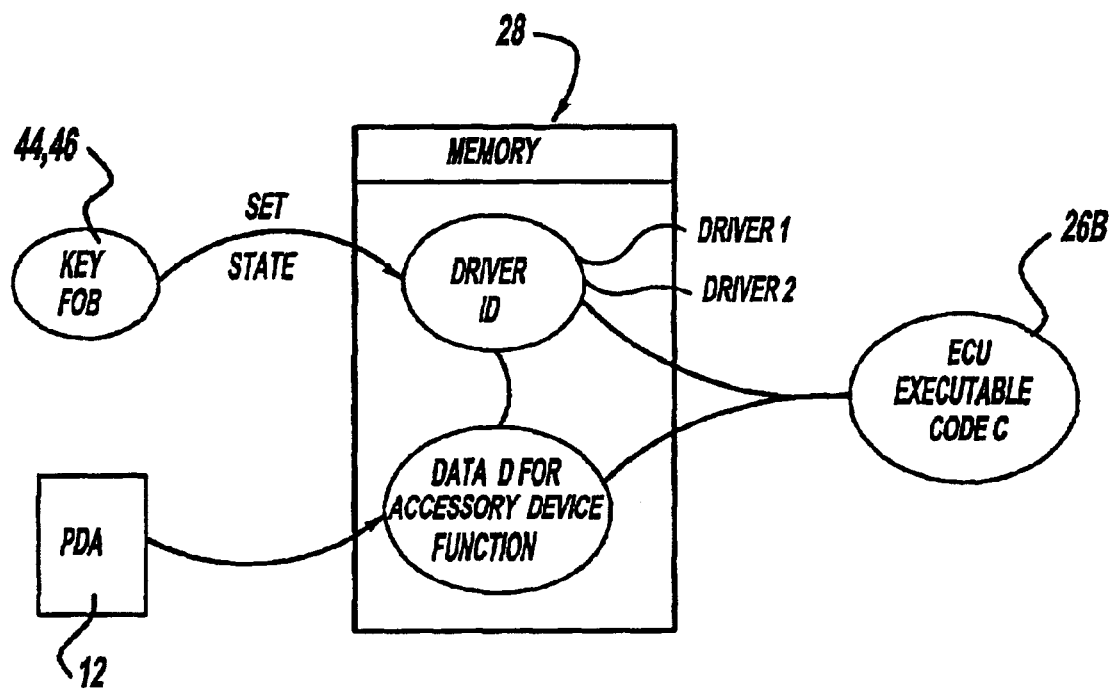
FIG. 12 is a schematic illustrating the relationship of driver ID and user preference data in a system according to the invention.

As illustrated in FIG. 12, either key fob 44, 46 can set the state of the memory 28 to indicate the driver ID, such as Driver 1 or Driver 2, upon which the data for vehicle preference is read from the appropriate data location in the data structure D. When reading the data structure D or executing a particular vehicle preference, the microcontroller 26 executes code C written to the memory 26B of the microcontroller 26. The microcontroller 26 uses both driver ID and data structure D to execute the code C. Prior to executing the code C, the driver ID must be identified in order to execute the code incorporating the proper data segments of the data structure D.

The description of the invention is merely exemplary in nature and, thus, variations that do not depart from the gist of the invention are intended to be within the scope of the invention. Such variations are not to be regarded as departure from the spirit and scope of the invention.

APPENDIX A

| ITEM | | | | | Driver's ID |
|---|---|---|---|---|---|
| Identifier | | | | | 000 |
| b4 | b3 | b2 | b1 | b0 | Detail |
| x | x | 0 | 0 | 1 | Driver 1 |
| x | x | 0 | 1 | 0 | Driver 2 |

| ITEM | | | | | Auto Light |
|---|---|---|---|---|---|
| Identifier | | | | | 001 |
| b4 | b3 | b2 | b1 | b0 | Detail |
| x | x | 0 | 0 | 0 | No auto light |
| x | x | 0 | 0 | 1 | Auto tight always ON |
| x | x | 0 | 1 | 0 | ON in high brightness |
| x | x | 0 | 1 | 1 | ON in medium brightness |
| x | x | 1 | 0 | 0 | ON in low brightness |
| 0 | 0 | x | x | x | OFF when IG is OFF and driver's door is opened |
| 0 | 1 | x | x | x | OFF when IG is OFF and driver's door is opened then closed |
| 1 | 0 | x | x | x | OFF when IG is OFF and keyless lock is activated |

| ITEM | | | | | Auto Door Locks |
|---|---|---|---|---|---|
| Identifier | | | | | 010 |
| b4 | b3 | b2 | b1 | b0 | Detail |
| x | x | x | 0 | 0 | Auto Lock disable) |
| x | x | x | 0 | 1 | Doors lock when IG is ON. |
| x | x | x | 1 | 0 | Doors lock when vehicle speed is >5 km/h |
| x | x | x | 1 | 1 | Doors lock when shifted out of PARK |
| x | 0 | 0 | x | x | Unlock when in park and vehicle speed = 0 km/h |
| x | 0 | 1 | x | x | Unlock when IG is OFF( 1: valid / 0 : invalid) |
| x | 1 | 0 | x | x | Unlock when key sw is OFF |
| 0 | x | x | x | x | Driver's door only unlocks |
| 1 | x | x | x | x | All doors unlock( 1 : valid / 0 : invalid) |

| ITEM | | | | | Instrument Panel |
|---|---|---|---|---|---|
| Identifier | | | | | 011 |
| b4 | b3 | b2 | b1 | b0 | Detail |

APPENDIX A-continued

| | | | | | |
|---|---|---|---|---|---|
| x | 0 | 0 | 0 | 0 | Instrument panel brightness 0 |
| x | 0 | 0 | 0 | 1 | Instrument panel brightness 1 |
| x | 0 | 0 | 1 | 0 | Instrument panel brightness 2 |
| x | 0 | 0 | 1 | 1 | Instrument panel brightness 3 |
| x | 0 | 1 | 0 | 0 | Instrument panel brightness 4 |
| x | 0 | 1 | 0 | 1 | Instrument panel brightness 5 |
| x | 0 | 1 | 1 | 0 | Instrument panel brightness 6 |
| x | 0 | 1 | 1 | 1 | Instrument panel brightness 7 |

| ITEM | | | | | Auto Light Off Timer 1 (if t < 31) |
|---|---|---|---|---|---|
| Identifier | | | | | 100 |
| b4 | b3 | b2 | b1 | b0 | Detail |
| 0 | 0 | 0 | 0 | 0 | Auto light OFF timer is 0 seconds (headlights OFF immediately for timed OFF slection) |
| 0 | 0 | 0 | 0 | 1 | Auto light OFF timer is 1 seconds (headlights OFF after 1 seconds for timed OFF slection) |
| 0 | 0 | 0 | 1 | 0 | Auto light OFF timer is 2 seconds (headlights OFF after 2 seconds for timed OFF slection) |
| | | | ↓ | | |
| 1 | 1 | 1 | 1 | 1 | Auto light OFF timer is 31 seconds (headlights OFF after 31 seconds for timed OFF slection) |

| ITEM | | | | | Auto Light off Timer 2 (if t > 31) |
|---|---|---|---|---|---|
| Identifier | | | | | 101 |
| b4 | b3 | b2 | b1 | b0 | Detail |
| 0 | 0 | 0 | 0 | 1 | Auto light OFF timer is 32 seconds (headlights OFF after 32 seconds for timed OFF slection) |
| 0 | 0 | 0 | 1 | 0 | Auto light OFF timer is 33 seconds (headlights OFF after 33 seconds for timed OFF slection) |
| 0 | 0 | 0 | 1 | 1 | Auto right OFF timer is 34 seconds (headlights OFF after 34 seconds for timed OFF slection) |
| | | | ↓ | | |
| 1 | 1 | 1 | 0 | 1 | Auto light OFF timer is 60 seconds (headlights OFF after 60 seconds for timed OFF slection) |

| ITEM | | | | | Dome Light Timer |
|---|---|---|---|---|---|
| Identifier | | | | | 110 |
| b4 | b3 | b2 | b1 | b0 | Detail |
| 0 | 0 | 0 | 0 | 0 | Dome Light OFF timer is 0 seconds (dome light OFF immediately after closing the driver's door) |
| 0 | 0 | 0 | 0 | 1 | Dome light OFF timer is 1 second (dome light OFF 1 second after dosing the driver's door) |
| 0 | 0 | 0 | 1 | 0 | Dome light OFF timer is 2 seconds (dome light OFF 2 seconds after closing the driver's door) |
| | | | ↓ | | |
| 1 | 1 | 1 | 1 | 0 | Dome light OFF timer is 30 seconds (dome light OFF 30 seconds after closing the driver's door) |

| ITEM | | | | | Buzzer |
|---|---|---|---|---|---|
| Identifier | | | | | 111 |
| b4 | b3 | b2 | b1 | b0 | Detail |
| 0 | 0 | 0 | 0 | 0 | No buzzer |
| 0 | 0 | 0 | 0 | 1 | Buzzer On if the emergency brake is on when the vehicle is shifted out of PARK |
| 0 | 0 | 0 | 1 | 0 | Buzzer On if any door is ajar when the vehicle is shifted out of PARK |

What is claimed is:

1. A system for managing user preference settings in a vehicle, the system comprising:
an electronic control unit including a microcontroller and an electronic control unit memory, the electronic control unit controlling accessory devices, wherein the electronic control unit memory includes a code portion and a data portion, the code portion including a control algorithm executed by the microcontroller to control the accessory devices, the data portion being written with the user preference data and read by the microcontroller when executing the control algorithm;

a data controller in communication with the microcontroller and adapted to receive user preference data;

a PDA including a PDA processor, PDA memory, and transceiver in electrical communication, the PDA managing the user preference data, and the transceiver adapted to transmit the user preference data from the PDA to the data controller; and wherein the preference data is transmitted from the PDA to the electronic control unit via the data controller, the microcontroller controlling the accessory devices according to the user preference data.

2. The system according to claim 1, wherein the PDA transmits the user preference data to the data controller by infrared transmission.

3. The system according to claim 1, wherein the PDA transmits the user preference data to the data controller by radio frequency transmission.

4. The system according to claim 1, wherein the user preference data includes preference settings for vehicle accessory devices.

5. The system according to claim 1, wherein the microcontroller controls the accessory devices according to the user preference data through a driver circuit.

6. The system according to claim 1, wherein the data portion has a data structure including a driver ID, and the microcontroller reads particular data from the data structure by referencing the driver ID when executing the control algorithm.

7. The system according to claim 1, wherein the PDA is a hand-held computer.

8. The system according to claim 1, wherein the PDA is a hand-held device including a processor and memory.

9. The system according to claim 1, wherein the data controller includes a wireless transceiver adapted to tirelessly receive the user preference data from the transceiver of the PDA.

10. The system according to claim 9, wherein the data controller further includes an encoder/decoder to facilitate communication between the wireless transceiver and the microcontroller.

11. The system according to claim 1, further comprising a keyless receiver adapted to receive a control signal from a key fob and in communication with the microcontroller to transmit the control signal.

12. The system according to claim 11, wherein the electronic control unit memory includes a code portion and a data portion, the code portion including a control algorithm executed by the microcontroller to control the accessory devices, the data portion being written with the user preference data and read by the microcontroller when executing the control algorithm.

13. The system according to claim 12, wherein the data portion has a data structure including a driver ID, and the microcontroller reads particular data from the data structure by referencing the driver ID when executing the control algorithm.

14. The system according to claim 12, wherein the data portion has a data structure including a driver ID, the driver ID identifying one of multiple user preference data sets stored in the data portion of the electronic control unit memory.

15. The system according to claim 14, wherein the driver ID further identifies user preference data based on a key fob control signal.

16. The system according to claim 1, wherein the user preference settings are input to the PDA, the PDA executing code in the PDA memory to convert the user preference settings to the user preference data transmitted from the PDA to the electronic control unit.

17. The system according to claim 16, wherein the PDA is adapted to connect to a network for receiving code to be executed when converting the user preference settings to user preference data.

18. The system according to claim 17, wherein the network is the Internet.

19. The system according to claim 17, wherein receiving code includes updating code in the PDA memory.

* * * * *